2,973,270
CAKE MIXES AND IMPROVED SHORTENINGS THEREFOR

Jerome B. Thompson and Bruce D. Buddemeyer, Kansas City, Mo., assignors to The Paniplus Company, Rye, N.Y., a corporation of Delaware
No Drawing. Filed Dec. 19, 1958, Ser. No. 781,451
15 Claims. (Cl. 99—123)

The present invention relates to improvements in cake mixes used in the preparation of cakes, particularly high-ratio cakes in which the ratio of sugar to flour is over 1:1 and improved shortening compositions employed therein.

It has been well established that in the art of cake making not only are the amounts of ingredients in a formula and their method and time of incorporation in a batter extremely important, but also their very nature. The nature of the shortening is most important, and quality shortenings are recognized as essential ingredients in layer cake formulas and have been demonstrated to perform several very important functions.

During the first stage of cake batter preparation, air is incorporated into the mixture, whether shortening and sugar are simply creamed together in the traditional manner or whether a prepared mix of all the dry ingredients is mixed with a limited amount of water. As the batter is built up by adding more ingredients or water this air is dispersed throughout the batter as minute globules or nuclei. It is these nuclei that are expanded during baking by heat and the escape of leavening gases released by the baking powders into them. It is the size of these nuclei and their number and distribution which determine to a large extent the characteristics of volume, symmetry, crumb sheen and brightness of the cake produced. The ability of a batter to hold the air beaten into it is largely dependent on the emulsifying properties of the shortening employed.

In addition to the emulsification property so necessary to proper batter aeration, shortening produces other desirable effects in the complex colloidal system of the cake batter. A quality shortening effects the continuity of the albumen structure which binds the cake ingredients in such a way that the protein network is rendered less intact through the body of the cake. This action is necessary for proper eating characteristics and is responsible for tenderness or increased "shortness" in the cake.

The desire of the cake baker or housewife has been to produce cakes with as high a ratio of sugar to flour in the formulae as possible. These sweeter or high ratio cakes (over 1:1) are a more desirable confection with better keeping qualities. This desire was realized to some extent with the development of the so-called "high ratio" or emulsifier shortenings. These are produced by "superglycerinating" or conducting interesterification reactions in the shortening in the presence of excess glycerine. This results in the formation of mono and diglycerides which act as emulsifiers and when used in high ratio cakes the desired increased batter stability is obtained especially when the older multi-stage procedures are employed. Additional stability has been desired, however, and improved shortening compositions are necessary for the preparation of completely satisfactory high ratio prepared dry cake mixes.

It is an object of the present invention to provide an improved shortening composition for use in the production of cakes.

It is a further object of the invention to provide improved cake mixes containing such improved shortening composition.

The improved shortening composition according to the invention has been specifically designed for use in the preparation of cakes and particularly "high ratio" cakes and not as a utility or general purpose shortening.

Shortenings of the usual type are, in general, triglyceride oils or fats derived from animal sources such as lard or tallow and from plant sources such as the seed oils or corn, cotton, soy and the like. It is normal practice for those shortenings to be refined and processed to improve their properties. The usual treatments include catalytic hydrogenation to improve the plasticity, increase hardness and reduce the iodine number of the fatty material and heat treatment in the presence of alkaline catalysts, with or without added glycerine, to improve the physical properties and functionality. For instance, the plastic super-glycerinated vegetable shortenings have been hydrogenated and subjected to interesterification reactions to improve the physical characteristics and increase the content of mono and diglycerides and to increase the emulsification properties of the shortening. Shortenings of the usual type may also contain glycerine and/or lecithin.

According to the invention it was found that cakes produced employing such usual types of shortenings could be materially improved when such shortenings prior to incorporation into batters or cake mixes have a relatively small quantity of an acyl lactylic acid dissolved therein. The acyl lactylic acids of the type concerned in the present invention have been described in our Patent No. 2,789,992 and are of the general formula:

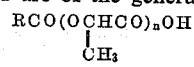

in which RCO is an acyl radical of a fatty acid containing from 16 to 24 carbon atoms and $n$ is a number between 1 and 6, preferably between 1 and 3, representing the average number of acyl groups present in the acyl lactylic acid product.

The improved shortening compositions according to the invention are produced by dissolving into the usual type shortening in the liquid state a small quantity of the acyl lactylic acid and then carefully stirring and tempering the resultant mixture. Final treatment may also include the chilling and whipping treatments of the Votator process in the case of plastic shortenings.

The quantity of acyl lactylic acids imparting optimum functionality to the shortening compositions varies somewhat dependent upon the nature of the usual type shortening employed as the basic shortening material but has been found empirically to be within a rather narrow range of about 3% or less by weight. However, good results are also obtained with quantities ranging from about 0.5 to 5%. Obviously, however, solutions of the usual shortenings and larger amounts of the acyl lactylic acids can be produced and used in lieu of only a portion of the usual shortening with the same net functional benefits resulting, and such compositions are to be considered to be a part of this invention. To obtain these benefits, it is only necessary that the acyl lactylic acid be dissolved in the fat or oil phase.

The functionality of the improved shortening compositions according to the invention in cake is superior to the usual type shortenings from which they are, in part, compounded. They provide for improved batter aeration and stability which results in cakes of notably improved volume, symmetry, and grain characteristics. The cakes obtained are exceptionally tender or "short" and have superior eating and keeping qualities. In addition the use of the improved compositions makes it much easier to prepare a satisfactorily balanced formula for a high ratio prepared dry cake mix.

The substantial improvements obtained with the shortening compositions containing dissolved acyl lactylic acids are most unexpected for when, as will appear below, the acyl lactylic acids are incorporated in cake mixes separately from the shortening rather than dissolved therein the resultant cakes do not differ markedly from cakes produced without the acyl lactylic acids.

The cake mixes according to the invention can be prepared, for example, by thoroughly blending together the usual mix ingredients, such as flour, baking powder and sugar, with the improved shortening composition; preferably the shortening composition is blended with the dry ingredients of such a mix before addition of liquid ingredients, such as water, milk, eggs, flavorings and the like.

The following examples will serve to illustrate the preparation of several embodiments of shortening compositions according to the invention, as well as their use in the preparation of cake mixes and cakes and the benefits derived therefrom.

*Example 1*

97 parts by weight of commercial super-glycerinated vegetable shortening, which contained about 9% mono and diglycerides and used especially for "high ratio" sugar to flour cakes, was melted with three parts of stearyl 2-lactylic acid (stearic acyl lactylic acid ester containing an average of about 2 lactyl groups). The homogeneous molten mixture was whipped with a small propeller type mixer and rapidly chilled. The compound obtained was a white plastic shortening at room temperature which differed not at all in appearance from the original.

The untreated shortening as well as the improved composition were compared as to functionality in a high sugar to flour ratio formula, for a white layer cake, using a rather typical dry mix procedure. The dry mixes prepared, differing only in the type of shortening, were as follows:

Ingredient: Gms.
    Cake flour _____ 110
    Salt _____ 3
    Baking powder _____ 7
    Sugar _____ 152
    Powdered milk _____ 11
    Egg albumen _____ 10
    Shortening _____ 33

The dry ingredients were blended thoroughly and shortenings were cut into and blended with the mixture, using a Hobart M–50 mixer at low speed.

The batters were prepared in three steps. Each step consisted of adding 57 ml. of water to the batter, mixing at low speed of the mixer for three minutes and scraping down the bowl. Batter temperatures were maintained at 70° F. A known volume of the batter was weighed and the batter was transferred in 230 gm. portions to 6 inch pans and baked at 375° F. for 27 minutes. After cooling, the cakes were scored subjectively, using the system of the American Institute of Baking which is a summary of the factors of symmetry, volume, crust and crumb color, grain, texture, flavor and aroma and eating quality. Comparative volumes of the layers were determined by rape seed displacement.

The comparisons of the cakes are tabulated below and demonstrate the extremely efficient aeration accomplished by the improved shortening compound and the well-nigh perfect cake obtained by its use.

| Shortening | Specific Gravity Batter | Quality Score | Cake Volume |
|---|---|---|---|
| Control (usual "high ratio" shortening) | 1.18 | 87 | 580 |
| Improved shortening containing stearyl 2-lactylic acid | .99 | 100 | 660 |

*Example 2*

Stearyl 2-lactylic acid was blended at several levels with a pure vegetable shortening made from hydrogenated vegetable oil. The mixtures contained 1.5, 3.0, 4.5 and 6.0 percent by weight stearyl 2-lactylic acid. The compositions were accomplished by weighing the ingredients into a suitable container, warming to approximately 80° C. and then agitating vigorously while cooling to a plastic consistency. At room temperature the shortening mixtures appeared as white fluffy aerated plastics not unlike the original shortening prior to combination.

White layer cakes were prepared containing the four shortening lactylate mixtures and the untreated shortening. The premix procedure described in Example 1 was employed in the evaluation and comparison of the prepared shortenings.

The comparative data of the layer cakes produced are tabulated below.

| Shortening | Quality Score | Volume (cc.) |
|---|---|---|
| Control | 85 | 530 |
| 1.5% Stearyl 2-lactylic acid | 87 | 540 |
| 3.0% Stearyl 2-lactylic acid | 98 | 600 |
| 4.5% Stearyl 2-lactylic acid | 95 | 550 |
| 6.0% Stearyl 2-lactylic acid | 93 | 530 |

A subjective scoring system was employed in ascertaining the quality characteristics of the cakes and volumes were measured by the rape seed displacement method.

The cake formula employed was a high ratio recipe containing 1.4 parts sugar for each 1 part of flour. As a result, the batter containing untreated shortening lacked emulsification properties to the extent the batter curdled. An open grain, coarse textured product of moderate appeal resulted.

The stearyl 2-lactylic acid fortification provided the emulsification properties required to stabilize the ingredients. Remarkable improvement was obtained when combining 3.0% stearyl 2-lactylate with the vegetable shortening. A chalky white, highly aerated batter was produced with this combination. Crumb color of the resultant cake was extremely white as compared with the control and grain was uniformly fine with a smooth silky texture. The 3% level produced optimum effectiveness in the present series and amounts exceeding the 3% value enhanced cake quality but not to the extent of the 3 percent.

*Example 3*

A variety of acyl lactylic acids are active in combination with shortening in enhancing the quality and volume of the white layer cake.

Shortening mixtures containing a commercial unimproved vegetable shortening and 3% of several representative acyl lactylates were compounded. The preparation involved raising the mixtures to a melt and then votating during a cooling period until a stable aerated plastic consistency was accomplished.

The special shortening mixtures were evaluated in the testing procedure described under Example 1. The following data were collected during the course of the experiment.

| Shortening | Quality Score | Volume |
|---|---|---|
| Control | 85 | 540 |
| Stearyl 2-lactylic acid | 98 | 630 |
| Stearyl 3-lactylic acid | 98 | 590 |
| Stearyl 4-lactylic acid | 92 | 550 |
| Stearyl 5-lactylic acid | 95 | 570 |
| Palmityl 2-lactylic acid | 92 | 610 |
| Oleyl 2-lactylic acid | 92 | 600 |
| Stearyl 2-lactylic acid [1] | 86 | 530 |

[1] Control shortening, 3% stearyl 2-lactylic acid introduced into premix ingredients as a dry powder.

From the above tabulation it is evident the stearyl lactylic acids containing a lactyl moiety up to five lactyl groups are active in providing emulsification and stabilization properties and in promoting quality improvements in the physical charcteristics of the baked products. Furthermore, the palmityl and oleyl esters of 2-lactylic acid, combined with vegetable shortening in the amount of 3.0% by weight measurably improve the quality and volume of white layer cakes therein contained.

Stearyl 2-lactylic acid, 3% by weight based on the shortening, was blended with the premix prior to the addition of the control vegetable shortening. The baked product resultant from this formulation characterized the control cake to a considerable extent. The grain structure was rather open, texture coarse and volume 20% inferior to the special shortening containing 3% stearyl 2-lactylic acid.

Example 4

Shortening compositions were prepared by blending 0.5, 1.0, 2.0 and 3.0% stearyl 2-lactylic acid by weight with a superglycerinated comercial shortening in the manner described in Example 2.

Yellow cakes were compared containing untreated shortening and the improved compositions. There preparation involved combining the ingredients listed below in a dry premix, cutting in the shortening blends and mixing to homogeneity.

| Percent | Ingredient | | |
|---|---|---|---|
| 100 | Flour | 110.0 | |
| 3.00 | Salt | 3.3 | |
| 6.25 | Baking Powder | 6.9 | |
| 120 | Sugar | 132.0 | |
| 12.5 | Powdered Milk | 13.8 | |
| 50.0 | Shortening | 55.0 | |
| 70.0 | Water | 77.0 | Add to above and mix 4 minutes at low speed. |
| 1.5 | Vanilla | | |
| 50.0 | Whole Eggs | 55.0 | Mix together and add in 4 aliquots at low speed. |
| 45.0 | Water | 50.0 | |

Into greased round 6" pans were scaled 230 g. batter which were baked 30 mins. at 175° C. The cakes were cooled 45 minutes, volumes were determined by a displacement technique and then cut and scored subjectively.

The data below illustrates the effect of increasing amount of stearyl 2-lactylic acid in an average yellow cake formula.

| Shortening | Batter | | Cake | |
|---|---|---|---|---|
| | Specific Gravity | Viscosity[1] | Quality | Volume |
| Control | 1.160 | 1.5 | 91 | 560 |
| 0.5% stearyl 2-lactylic acid | 1.041 | 2.0 | 97 | 560 |
| 1.0% stearyl 2-lactylic acid | 1.010 | 5.0+ | 96 | 585 |
| 2.0% stearyl 2-lactylic acid | 0.910 | 5.0+ | 96 | 600 |
| 3.0% stearyl 2-lactylic acid | 0.900 | 5.0+ | 95 | 615 |

[1] Numerical values for comparison based on the time interval required for the cake batter to flow through an Ostwald type viscosity tube.

Marked improvement was produced by the use of the special shortening containing stearyl 2-lactylic acid. Optimum action was exhibited in the yellow layer formulation from the quality standpoint at 0.5% based upon shortening weight. Cake volume increased with increasing levels of the fatty acid ester and may be correlated with specific gravity and viscosity. In actuality, the specific gravity and viscosity data exhibit the aeration and emulsification improvement effected by the addition of stearyl 2-lactylic acid. The data indicates levels exceeding 1% tend toward over emulsification, however, excessive amounts exceeding the optimum level are not appreciably deleterious.

Example 5

Three parts by weight of stearyl 2-lactylic acid were warmed with 97 parts of a "high ratio" superglycerinated shortening containing about 9% of mono and diglycerides. The melt was stirred vigorously with a propeller type mixer to homogeneity and then cooled with continued whipping to produce a fluffy white plastic shortening.

Four cakes were prepared following the standard white layer formula previously described in Example 1. Employing the dry mix procedure, the cakes differed only in the manner in which the stearyl 2-lactylic acid was incorporated.

A control cake was baked containing the "high ratio" shortening without fortification for comparative purposes. The test cakes all contained stearyl 2-lactylic acid but introduced in different carriers. They were as follows:

| Variable | Batter, Specific Gravity | Cake | |
|---|---|---|---|
| | | Volume | Quality |
| Control | 1.200 | 510 | 89 |
| 3% stearyl 2-lactylic acid dispersed in flour | 1.109 | 555 | 92 |
| 3% stearyl 2-lactylic acid dispersed in shortening | 1.045 | 585 | 100 |
| 3% stearyl 2-lactylic acid dispersed in shortening and 3% dispersed in flour | 1.009 | 570 | 97 |

During the course of the experiment the above data were obtained. The percentage levels of acid are based upon the shortening weight which was maintained constant. In dispersing the stearyl 2-lactylic acid in the flour, 20 gms. flour was removed from the premix to permit constant ingredient weights in all the cakes prepared. The acid was dispersed in this flour by premelting and mixing with the flour prior to adding to the dry ingredients in the mixer.

The results clearly illustrate the unexpected improvements attained according to the invention. Cake quality and volume were greatly enhanced by the employment of the acid dispersed in the lipid constituents of the formula. At a comparable level dispersed in flour, improvement was minimal and may be attributed to a small portion of the fatty ester coming in contact with the shortening. Furthermore, the use of 3% stearyl 2-lactylic acid dispersed in flour and shortening exhibited no improvement over the shortening dispersion singly and in actuality was slightly deleterious to the aeration and emulsification balance.

Example 6

Two series of test cakes were prepared differing only in the shortening composition employed. In both series, mixing time at each stage was varied from undermixed to overmixed and ranged from two to four minute mixing intervals. The control series contained a commercial superglycerinated shortening commonly employed in high sugar to flour formulations. A second group was prepared containing an equal quantity of the same shortening, but fortified with 3% by weight stearyl 2-lactylic acid according to the invention.

The white cake formulation and procedure as previously outlined in Example 1 was followed with the exception of the mixing time variations.

Cake quality and volume and batter specific gravity are tabulated below for comparison.

| Variable | Batter, Specific Gravity | Cake | |
|---|---|---|---|
| | | Quality | Volume |
| Control: | | | |
| 2 Min. Mix/stage | 1.205 | 89 | 460 |
| 3 Min. Mix/stage | 1.186 | 91 | 480 |
| 4 Min. Mix/stage | 1.192 | 90 | 470 |
| Stearyl 2-lactylic acid: | | | |
| 2 Min. Mix/stage | 1.052 | 99 | 560 |
| 3 Min. Mix/stage | 1.040 | 100 | 580 |
| 4 Min. Mix/stage | 1.017 | 98 | 570 |

As illustrated above, tolerance was much improved to over and undermixing by the incorporation of 3% by weight stearyl 2-lactylic acid in the shortening. Over all cake quality and volume was measurably enhanced by the ester acid addition regardless of mixing time employed.

Improvement was readily observed in the batters containing the shortening fortified with stearyl 2-lactylic acid which were creamier and highly aerated as compared to the thin, watery control batters.

Following storage of five days, cakes containing the stearyl 2-lactylic acid possessed crumb and texture characteristics very similar to freshly baked products. The three minute, optimum, mixing time product was the superior of the three containing the fatty acid ester. Cakes not containing the special shortening exhibited considerable staling, the crumb structure being quite firm and texture harsh.

We claim:

1. A cake mix comprising flour, baking powder and sugar intimately blended with a shortening composition comprising a triglyceride based fatty shortening material having dissolved therein at least 0.5% of an acyl lactylic acid product of the formula $$RCO(OCHCO)_nOH$$
$$|$$
$$CH_3$$

wherein RCO is an acyl group of a fatty acid containing 16 to 24 carbon atoms and $n$ is a number from 1 to 6 representing the average number of lactyl groups in said acyl lactylic acid product.

2. A cake mix comprising flour, baking powder and sugar in which the ratio of sugar to flour is over 1:1 intimately blended with a shortening composition comprising a triglyceride based fatty shortening material having dissolved therein at least 0.5% of an acyl lactylic acid product of the formula $$RCO(OCHCO)_nOH$$
$$|$$
$$CH_3$$

wherein RCO is an acyl group of a fatty acid containing 16 to 24 carbon atoms and $n$ is a number from 1 to 6 representing the average number of lactyl groups in said acyl lactylic acid product.

3. A cake mix according to claim 2 in which the quantity of acyl lactylic acid dissolved in said fatty shortening material is about 0.5% to 5%.

4. A cake mix according to claim 2 in which the quantity of acyl lactylic acid dissolved in said fatty shortening material is about 3%.

5. A cake mix according to claim 2 in which the average number of lactyl groups in said acyl lactylic product is between 1 and 3.

6. A cake mix according to claim 2 in which the average number of lactyl groups in said acyl lactylic product is about 2.

7. A cake mix according to claim 2 in which said acyl lactylic acid product is stearyl 2-lactylic acid.

8. A cake mix according to claim 2 in which said shortening material is superglycerinated triglyceride based fatty shortening material.

9. A shortening composition comprising a triglyceride based fatty shortening material having dissolved therein at least 0.5% of an acyl lactylic acid product of the formula $$RCO(OCHCO)_nOH$$
$$|$$
$$CH_3$$

wherein RCO is an acyl group of a fatty acid containing 16 to 24 carbon atoms and $n$ is a number from 1 to 6 representing the average number of lactyl groups in said acyl lactylic acid product.

10. A shortening composition according to claim 9 in which the quantity of acyl lactylic acid dissolved in said fatty shortening material is about 0.5 to 5%.

11. A shortening composition according to claim 9 in which the quantity of acyl lactylic acid dissolved in said fatty shortening material is about 3%.

12. A shortening composition according to claim 9 in which the average number of lactyl groups in said acyl lactylic product is between 1 and 3.

13. A shortening composition according to claim 9 in which the average number of lactyl groups in said acyl lactylic product is about 2.

14. A shortening composition according to claim 9 in which said acyl lactylic acid product is stearyl 2-lactylic acid.

15. A shortening composition according to claim 9 in which said shortening material is a superglycerinated triglyceride based fatty shortening material.

References Cited in the file of this patent

UNITED STATES PATENTS

| | | |
|---|---|---|
| 2,611,704 | Jaeger | Sept. 23, 1952 |
| 2,744,826 | Thompson et al. | May 8, 1956 |
| 2,789,992 | Thompson et al. | Apr. 23, 1957 |